United States Patent
Hsu et al.

(10) Patent No.: US 10,084,683 B2
(45) Date of Patent: Sep. 25, 2018

(54) UNIFIED PROTOCOL DEVICE WITH SELF FUNCTIONAL TEST AND ASSOCIATED METHOD

(71) Applicant: MEDIATEK INC., Hsin-Chu (TW)

(72) Inventors: Hsuan-Jung Hsu, Hsinchu (TW);
Liang-Yen Wang, New Taipei (TW);
Horng-Bin Wang, Hsinchu (TW)

(73) Assignee: MEDIATEK INC., Hsin-Chu (TW)

(*) Notice: Subject to any disclaimer, the term of this patent is extended or adjusted under 35 U.S.C. 154(b) by 64 days.

(21) Appl. No.: 15/299,443

(22) Filed: Oct. 20, 2016

(65) Prior Publication Data
US 2018/0115480 A1    Apr. 26, 2018

(51) Int. Cl.
*H04L 12/26*    (2006.01)

(52) U.S. Cl.
CPC .............. *H04L 43/50* (2013.01); *H04L 43/18* (2013.01)

(58) Field of Classification Search
CPC ... H04L 2012/5628; H04L 1/24; H04L 1/242; H04L 1/244; H04L 41/5038; H04L 43/00; H04L 43/50; H04L 43/04; H04L 43/065; H04L 43/18
See application file for complete search history.

(56) References Cited

U.S. PATENT DOCUMENTS

| | | | | |
|---|---|---|---|---|
| 2013/0097460 A1* | 4/2013 | Jeong | ..................... | G06F 11/221 714/37 |
| 2015/0063377 A1* | 3/2015 | Shui | ..................... | H04L 7/0037 370/517 |
| 2016/0034413 A1* | 2/2016 | Park | ..................... | G06F 13/4265 710/105 |
| 2017/0176534 A1* | 6/2017 | Chellappan | ...... | G01R 31/31723 |

* cited by examiner

*Primary Examiner* — Ashley Shivers
(74) *Attorney, Agent, or Firm* — Winston Hsu

(57) ABSTRACT

A Unified Protocol (UniPro) device with self functional test includes a physical layer circuit and a UniPro interface. The physical layer circuit has a transmit (TX) port and a receive (RX) port, wherein the TX port and the RX port are connected to each other via a loopback link under a self-test mode. The UniPro interface generates an outgoing test pattern to the TX port, and checks an incoming test pattern received from the RX port under the self-test mode.

18 Claims, 7 Drawing Sheets

| 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 1 | ESC_PA | | | | | | | | EscParam_PA=PACP_BEGIN | | | | | | | |
| 0 | PACP_FunctionId=PACP_PWR_req | | | | | | | | | | | | | | | |
| 0 | DevID | | | | | | | | Reserved | | | | | | | |
| 0 | TxMode | | | | TxLane | | | | TxGear | | | RxMode | | | Flags | |
| 0 | | | | | | | | | | | | | RxLane | | RxGear | |
| 0 | PAPowerModeUserData[0] | | | | | | | | | | | | | | | |
| 0 | PAPowerModeUserData[1] | | | | | | | | | | | | | | | |
| 0 | PAPowerModeUserData[2] | | | | | | | | | | | | | | | |
| 0 | PAPowerModeUserData[3] | | | | | | | | | | | | | | | |
| 0 | PAPowerModeUserData[4] | | | | | | | | | | | | | | | |
| 0 | PAPowerModeUserData[5] | | | | | | | | | | | | | | | |
| 0 | PAPowerModeUserData[6] | | | | | | | | | | | | | | | |
| 0 | PAPowerModeUserData[7] | | | | | | | | | | | | | | | |
| 0 | PAPowerModeUserData[8] | | | | | | | | | | | | | | | |
| 0 | PAPowerModeUserData[9] | | | | | | | | | | | | | | | |
| 0 | PAPowerModeUserData[10] | | | | | | | | | | | | | | | |
| 0 | PAPowerModeUserData[11] | | | | | | | | | | | | | | | |
| 0 | CCITT CRC-16 | | | | | | | | | | | | | | | |

FIG. 2

| 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|----|
| 1 | ESC_PA |||||||| EscParam_PA=PACP_BEGIN |||||||||
| 0 | PACP_FunctionId=PACP_PWR_cnf |||||||||||||||||
| 0 | Reserved |||||||| FC ||| Status |||||
| 0 | PAPowerModeUserData[0] ||||||||||||||||
| 0 | PAPowerModeUserData[1] ||||||||||||||||
| 0 | PAPowerModeUserData[2] ||||||||||||||||
| 0 | PAPowerModeUserData[3] ||||||||||||||||
| 0 | PAPowerModeUserData[4] ||||||||||||||||
| 0 | PAPowerModeUserData[5] ||||||||||||||||
| 0 | PAPowerModeUserData[6] ||||||||||||||||
| 0 | PAPowerModeUserData[7] ||||||||||||||||
| 0 | PAPowerModeUserData[8] ||||||||||||||||
| 0 | PAPowerModeUserData[9] ||||||||||||||||
| 0 | DevID |||||||| Reserved ||| Flags ||||
| 0 | TxMode ||| TxLane ||| TxGear ||| RxMode ||| RxLane ||| RxGear |
| 0 | CCITT CRC-16 ||||||||||||||||

FIG. 3

UNIFIED PROTOCOL DEVICE WITH SELF FUNCTIONAL TEST AND ASSOCIATED METHOD

BACKGROUND

The present invention relates to testing functionality of a unified protocol (UniPro) device, and more particularly, to a UniPro device with self functional test and associated method.

Unified Protocol (UniPro) is developed by MIPI (Mobile Industry Processor Interface) Alliance, and is high speed interconnect technology for connecting the integrated circuits in the mobile or mobile influenced systems. Its target is to support multiple applications. For example, the popular applications planned to be connected to the UniPro interface may include CSI-3 developed by MIPI Alliance, UFS (Universal Flash Storage) developed by JEDEC (Joint Electron Device Engineering Council), Google Project Ara, etc.

A UniPro device may be regarded as having a UniPro interface and a physical layer (PHY) circuit, where the UniPro interface supports several layers in a UniPro stack between an upper layer (e.g., an application layer) and a lower layer (e.g., the physical layer). To test functionality of a UniPro device, a peer UniPro device is generally required to be connected to the UniPro device under test. That is, a transmit (TX) port of the UniPro device under test should be connected to a receive (RX) port of the peer UniPro device, and an RX port of the UniPro device under test should be connected to a TX port of the peer UniPro device. However, for some manufacture tests in the automatic test equipment (ATE) environment, only one UniPro device is available. Thus, there is a need for an innovative self functional test scheme which allows some critical tests to be performed using a single UniPro device only.

SUMMARY

One of the objectives of the claimed invention is to provide a UniPro device with self functional test and associated method.

According to a first aspect of the present invention, an exemplary Unified Protocol (UniPro) device with self functional test is disclosed. The UniPro device includes a physical layer circuit and a UniPro interface. The physical layer circuit has a transmit (TX) port and a receive (RX) port, wherein the TX port and the RX port are connected to each other via a loopback link under a self-test mode. The UniPro interface is configured to generate an outgoing test pattern to the TX port and check an incoming test pattern received from the RX port under the self-test mode.

According to a second aspect of the present invention, an exemplary method for performing self functional test upon a Unified Protocol (UniPro) device is disclosed. The UniPro device has a UniPro interface and a physical layer circuit. The exemplary method includes: connecting a transmit (TX) port of the physical layer circuit to a receive (RX) port of the physical layer circuit via a loopback link under a self-test mode; and utilizing the UniPro interface to generate an outgoing test pattern to the TX port and check an incoming test pattern received from the RX port under the self-test mode.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram illustrating a frame structure of a power mode change request frame according to the UniPro specification.

FIG. 3 is a diagram illustrating a frame structure of a power mode change confirm frame according to the UniPro specification.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
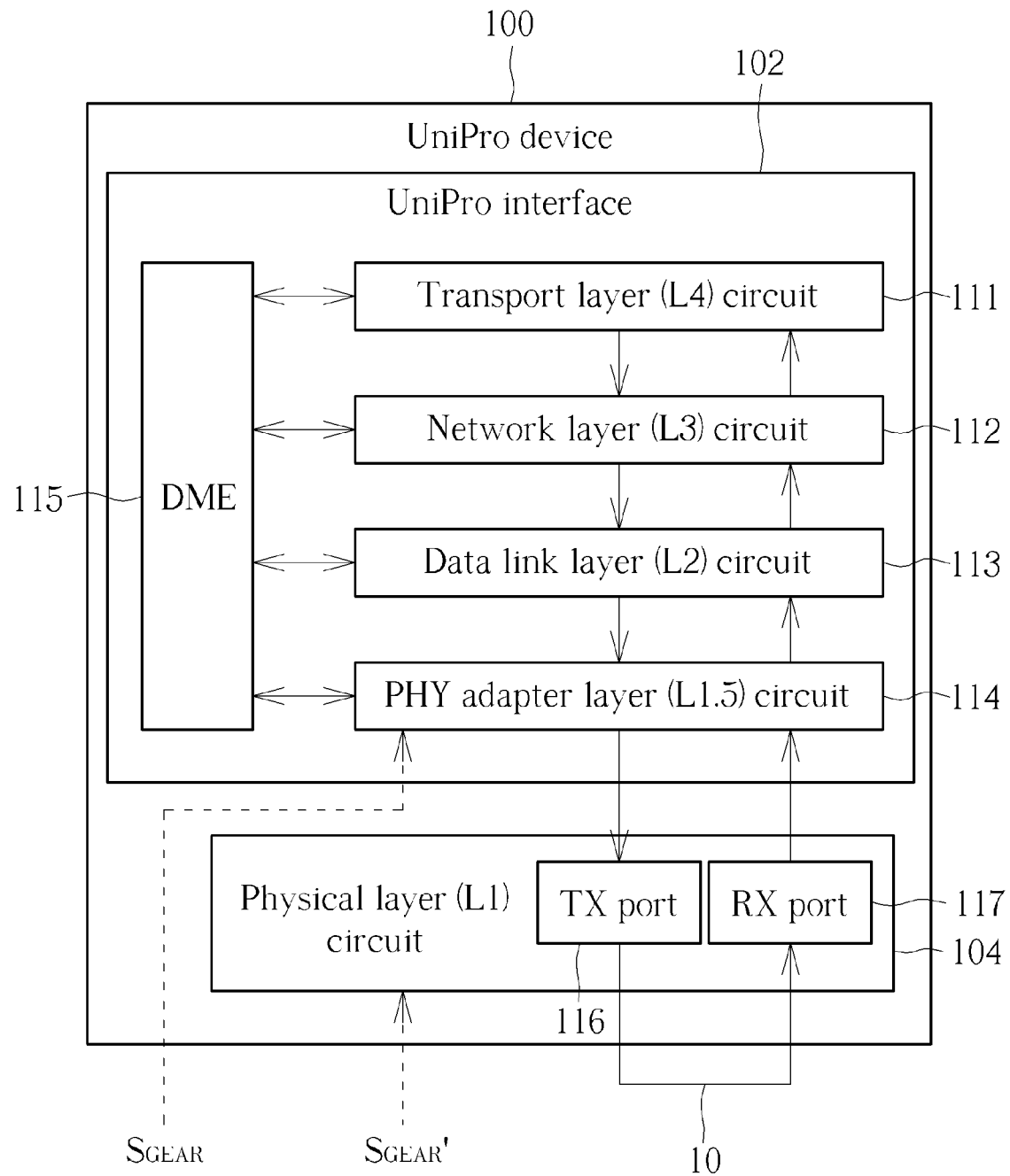
FIG. 1 is a diagram illustrating a UniPro device with self functional test according to an embodiment of the present invention.

FIG. 1 is a diagram illustrating a UniPro device with self functional test according to an embodiment of the present invention. The UniPro device 100 may be implemented by hardware circuitry, including a UniPro interface 102 and a physical layer (L1) circuit 104. For example, the physical layer (PHY) circuit 104 may be compliant with an MPHY specification developed by MIPI Alliance. The UniPro interface 102 may include a transport layer (L4) circuit 111, a network layer (L3) circuit 112, a data link layer (L2) circuit 113, a PHY adapter layer (L1.5) circuit 114, and a device management entity (DME) 115, wherein the DME 115 controls all layers in the UniPro stack. With regard to the physical layer (L1) circuit 104, it has a transmit (TX) port 116 and a receive (RX) port 117. Each of the TX port 116 and the RX port 117 has a plurality of data lanes. The TX port 116 is responsible for differential data transfer in the TX-direction, and the RX port 117 is responsible for differential data transfer in the RX-direction.

It should be noted that there is no master/slave distinction at the UniPro stack. Hence, peer-to-peer communication is supported by a UniPro device. Based on such observation, the present invention therefore proposes realizing the self functional test of the UniPro device 100 by connecting the TX port 116 and the RX port 117 of the same physical layer circuit (L1) 104 via a loopback link 10 under a self-test mode. For example, the loopback link 10 may be implemented using direct connection wires, and/or a software driver may enable the self-test mode of the UniPro device 100 by setting a control register in the UniPro interface 102.

Since the TX port 116 and the RX port 117 of the physical layer circuit 104 are connected by the loopback link 10, any data transmitted via the TX port 116 is received by the RX port 117. In other words, the UniPro device 100 under test also acts as its peer UniPro device. In this way, outputting data from a local UniPro device (i.e., UniPro device 100) is equivalent to receiving the same data transmitted from a remote UniPro device. Hence, the UniPro device 100 can be tested without a peer UniPro device In this embodiment, the UniPro interface 102 is configured to perform a link startup procedure under the self-test mode. The link startup procedure is a multiphase handshake, which exchanges UniPro trigger events to establish the initial link communication in both directions. Hence, the UniPro interface 102 (particularly, the PHY adapter layer circuit (L1.5) 114) generates a UniPro trigger event to the physical layer 104, the UniPro trigger event is transmitted via the TX port 116 of the physical layer 104, the same UniPro trigger event is received by the RX port 117 of the physical layer 104 due to the loopback link 10, and the received UniPro trigger event is transferred from the physical layer circuit 104 to the UniPro interface 102 (particularly, the PHY adapter layer (L1.5) circuit 114). By directly connecting the TX port 116 of the physical layer circuit 104 to the RX port 117 of the same physical layer circuit 104, the link startup procedure is achievable in the self-test mode without any modification made to a UniPro interface and a physical layer circuit.

After the link startup procedure is successfully completed, the UniPro device 100 exits the link startup procedure, and enters a low speed (LS) mode. In one exemplary embodiment, a test feature in the transport layer (L4) may be employed to perform the LS mode test. For example, the UniPro interface 102 (particularly, the transport layer (L4) circuit 111) is configured to generate an outgoing test pattern to the TX port 116 and check an incoming test pattern received by the RX port 117 under the self-test mode, where the incoming test pattern is originated from the outgoing test pattern passing through the loopback link 10.

To perform a high speed (HS) mode test, the UniPro device 100 is required to increase a high data exchange rate. For example, a power mode change handshake procedure may be performed to enter the HS mode and increase a data exchange rate under the self-test mode. Concerning a power mode change procedure, an initiator shall send a pacp_pwr_req frame (which is a request frame), and a receiver shall return a pacl_pwr_cnf frame (which is s confirm frame). A frame structure of a pacp_pwr_req frame specified in the UniPro specification is illustrated in FIG. 2. A frame structure of a pacp_pwr_cnf frame specified in the UniPro specification is illustrated in FIG. 3.

Since the TX port 116 is connected to the RX port 117 by the loopback link 10 under the self-test mode, the UniPro device 100 acts as the initiator as well as the receiver. In other words, the pacp_pwr_req frame generated from the UniPro interface 102 (particularly, the PHY adapter layer (L1.5) circuit 114) is transmitted via the TX port 116, and the same pacp_pwr_req frame is received by the RX port 117 at once due to the loopback link 10; and the pacp_pwr_cnf frame generated from the UniPro interface 102 (particularly, the PHY adapter layer circuit (L1.5) 114) is transmitted via the TX port 116, and the same pacp_pwr_cnf frame is received by the RX port 117 at once due to the loopback link 10.

Figure 4:
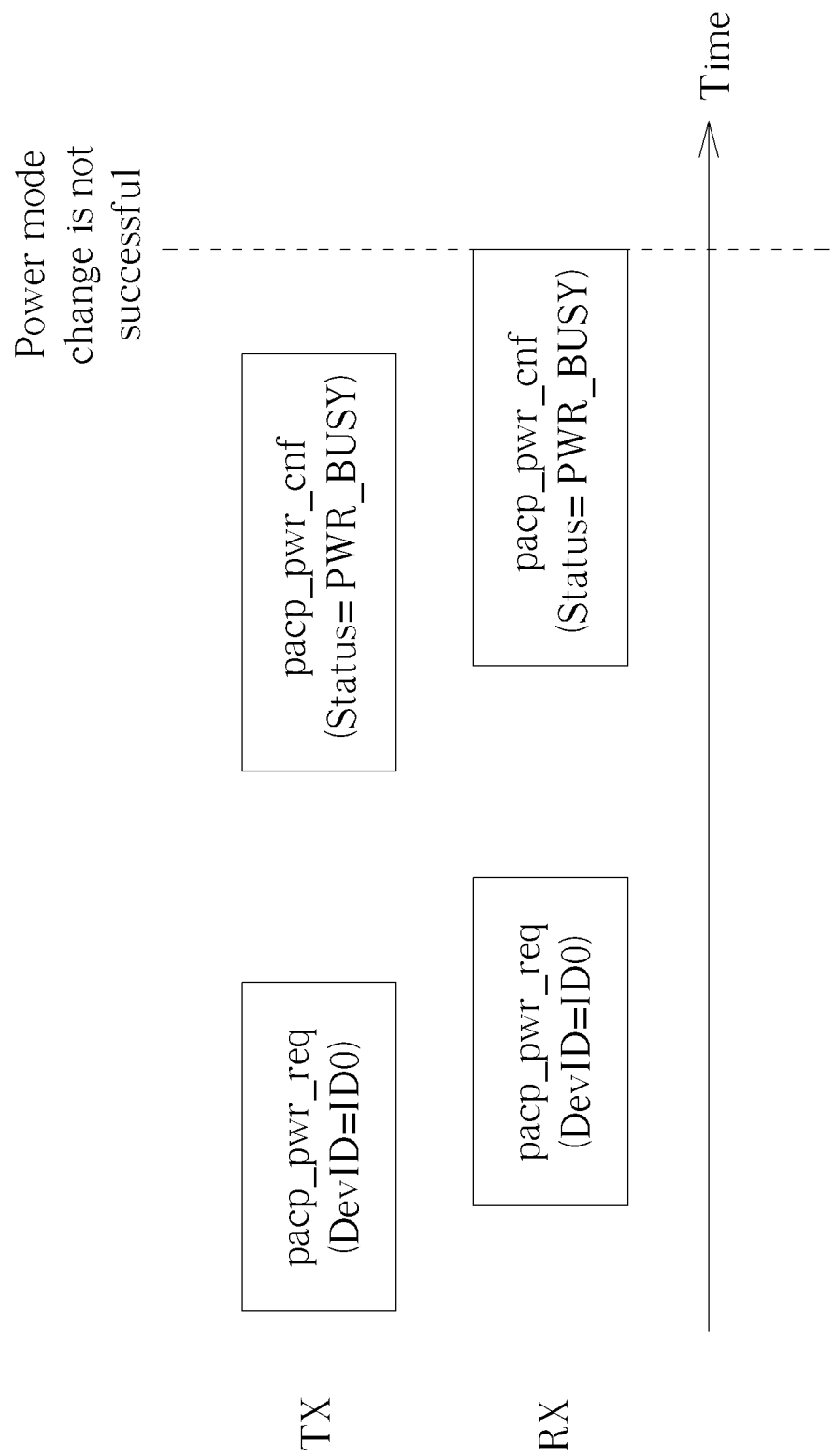
FIG. 4 is a diagram illustrating an unsuccessful power mode change procedure under a condition that a TX port and an RX port of a physical layer circuit are connected to each other via a loopback link.

Typically, the field "DevID" in the pacp_pwr_req frame shown in FIG. 2 records a local device identification (ID). However, when the UniPro interface 102 generates a pacp_pwr_req frame with the field "DevID" set by an actual device ID assigned to the UniPro device 100, no successful power mode change can be achieved. FIG. 4 is a diagram illustrating an unsuccessful power mode change procedure under a condition that a TX port and an RX port of a physical layer circuit are connected to each other via a loopback link. Suppose that the actual device ID of the UniPro device 100 is set by "ID0". The UniPro interface 102 (particularly, the PHY adapter layer circuit (L1.5)114) initiates a power mode change procedure by generating a pacp_pwr_req frame with DevID="ID0" to the physical layer (L1) circuit 104. The pacp_pwr_req frame with DevID="ID0" is transmitted via the TX port 116, and is received by the RX port 117 via the loopback link 10. The pacp_pwr_req frame received by the RX port 117 may be regarded as a request frame generated from a remote UniPro device. In accordance with the UniPro specification, a request frame generated from a remote UniPro device is rejected by a local UniPro device if the device ID of the remote UniPro device is larger or equal to the device ID of the local UniPro device. Since the device ID field of the pacp_pwr_req frame received by the RX port 117 is set by the actual device ID "ID0" assigned to the UniPro device 100, the UniPro interface 102 (particularly, the PHY adapter layer (L1.5) circuit 114) responds with a pacp_pwr_cnf frame with Status="PWR_BUSY" to the physical layer (L1) circuit 104, where the "PWR_BUSY" status indicates that the request was rejected due to concurrent access. The pacp_pwr_cnf frame with Status="PWR_BUSY" is transmitted via the TX port 116, and is received by the RX port 117 via the loopback link 10. As a result, the power mode change procedure is not successful.

To achieve a successful power mode change procedure under the self-test mode in which the TX port 116 is connected to the RX port 117 via the loopback link 10, the present invention proposes forcing a status field of a power mode change confirm frame (e.g., pacp_pwr_cnf frame) to be "PWR_OK" or intentionally setting a device ID field of a power mode change request frame (e.g., pacp_pwr_req frame) by a fake device ID that is different from an actual device ID assigned to a UniPro device under test.

Figure 5:
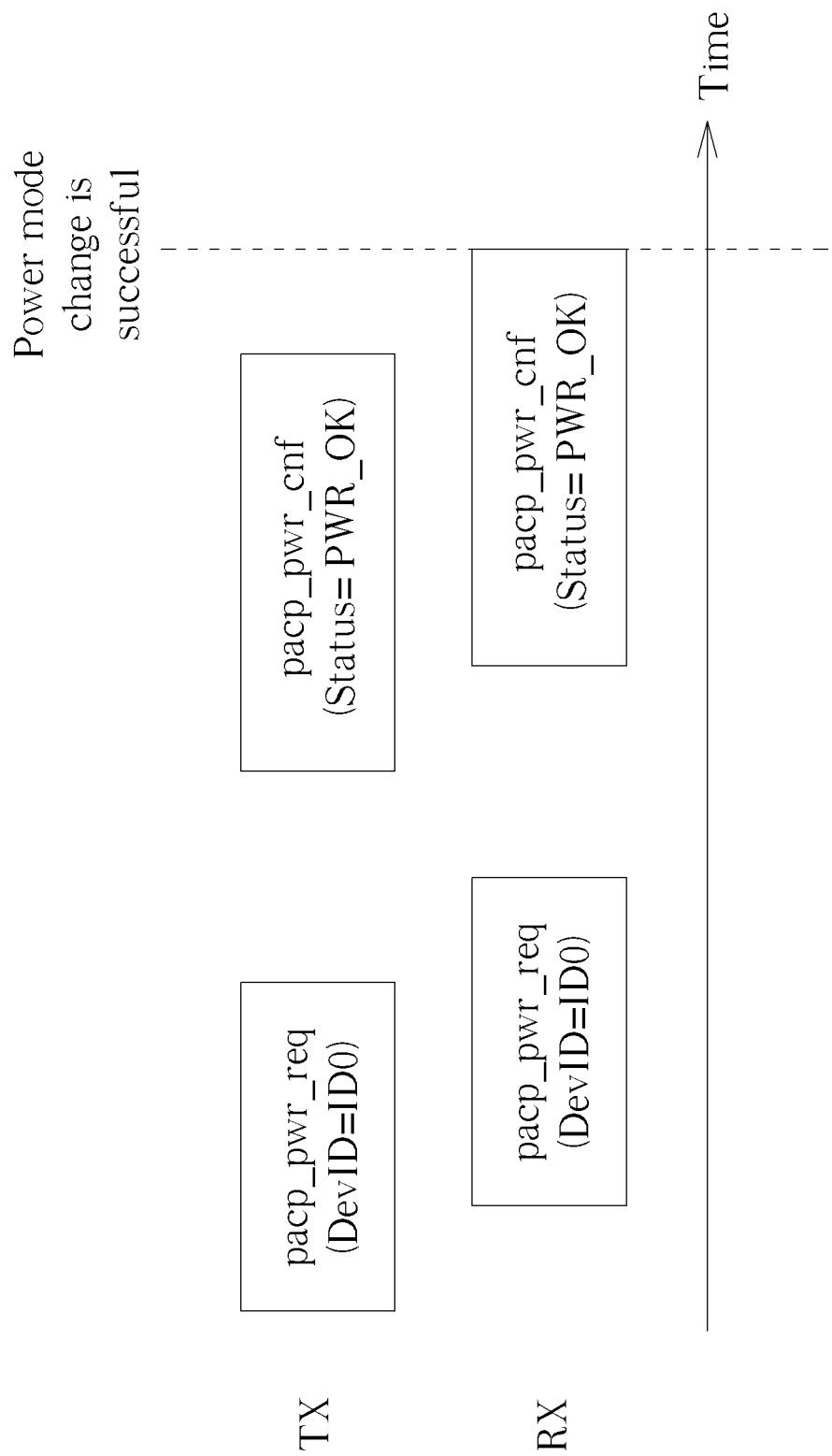
FIG. 5 is a diagram illustrating a successful power mode change procedure performed under a condition that a status field of a power mode change confirm frame is forced to indicate a "PWR_OK" status under a self-test mode according to an embodiment of the present invention.

FIG. 5 is a diagram illustrating a successful power mode change procedure performed under a condition that a status field of a power mode change confirm frame is forced to indicate a "PWR_OK" status under a self-test mode according to an embodiment of the present invention. Suppose that the actual device ID of the UniPro device 100 is set by "ID0". The UniPro interface 102 (particularly, the PHY adapter layer circuit 114) initiates a power mode change procedure by generating a pacp_pwr_req frame with DevID="ID0" to the physical layer (L1) circuit 104. The pacp_pwr_req frame with DevID="ID0" is transmitted via the TX port 116, and is received by the RX port 117 via the loopback link 10. As mentioned above, the pacp_pwr_req frame received by the RX port 117 may be regarded as a request frame generated from a remote UniPro device. In this embodiment, the UniPro interface 102 (particularly, the PHY adapter layer (L1.5) circuit 114) generates a pacp_pwr_cnf frame in response to the received pacp_pwr_req frame, wherein the status field of the pacp_pwr_cnf frame is forced to be "PWR_OK" (which indicates that the power mode change request was accepted and executed), regardless of a device ID "ID0" recorded in the received pacp_pwr_req frame and the actual device ID "ID0" assigned to the UniPro device 100. In other words, the PHY adapter layer (L1.5) circuit 114 is modified to force the status field of the pacp_pwr_cnf frame to be "PWR_OK" under the self-test mode. Although the device ID DevID="ID0" of the pacp_pwr_req frame received by the RX port 117 is the same as the actual device ID "ID0" assigned to the UniPro device 100, a pacp_pwr_cnf frame with Status="PWR_OK" is ensured to be generated by the UniPro device 100 (particularly, the PHY adapter layer (L1.5) circuit 114). The pacp_pwr_cnf frame with Status="PWR_OK" is transmitted via the TX port 116, and is received by the RX port 117 via the loopback link 10. In this way, the power mode change procedure can be successfully completed to enable the HS mode for increasing the data exchange rate. The settings of power mode and data exchange rate recorded in the fields TxMode, TxLane, TxGear, RxMode, RxLane, RxGear of the pacp_pwr_req frame are confirmed by the pacp_pwr_cnf frame that have the same settings recorded in the fields TxMode, TxLane, TxGear, RxMode, RxLane, RxGear, where the TxMode field indicates the UniPro power mode for TX-direction, the TxLane field indicates the active lane count for TX-direction, the TxGear field indicates the HS gear setting for TX-direction, the RxMode field indicates the UniPro power mode for RX-direction, the RxLane field indicates the active lane count for RX-direction, and the RxGear field indicates the HS gear setting for RX-direction. Based on settings of data exchange rate requested in the pacp_pwr_req frame and confirmed by the pacp_pwr_cnf frame, the UniPro interface 102 (particularly, the PHY adapter layer circuit 114) further controls the physical layer circuit 104 to enter the HS mode and operate at the high data exchange rate.

Figure 6:
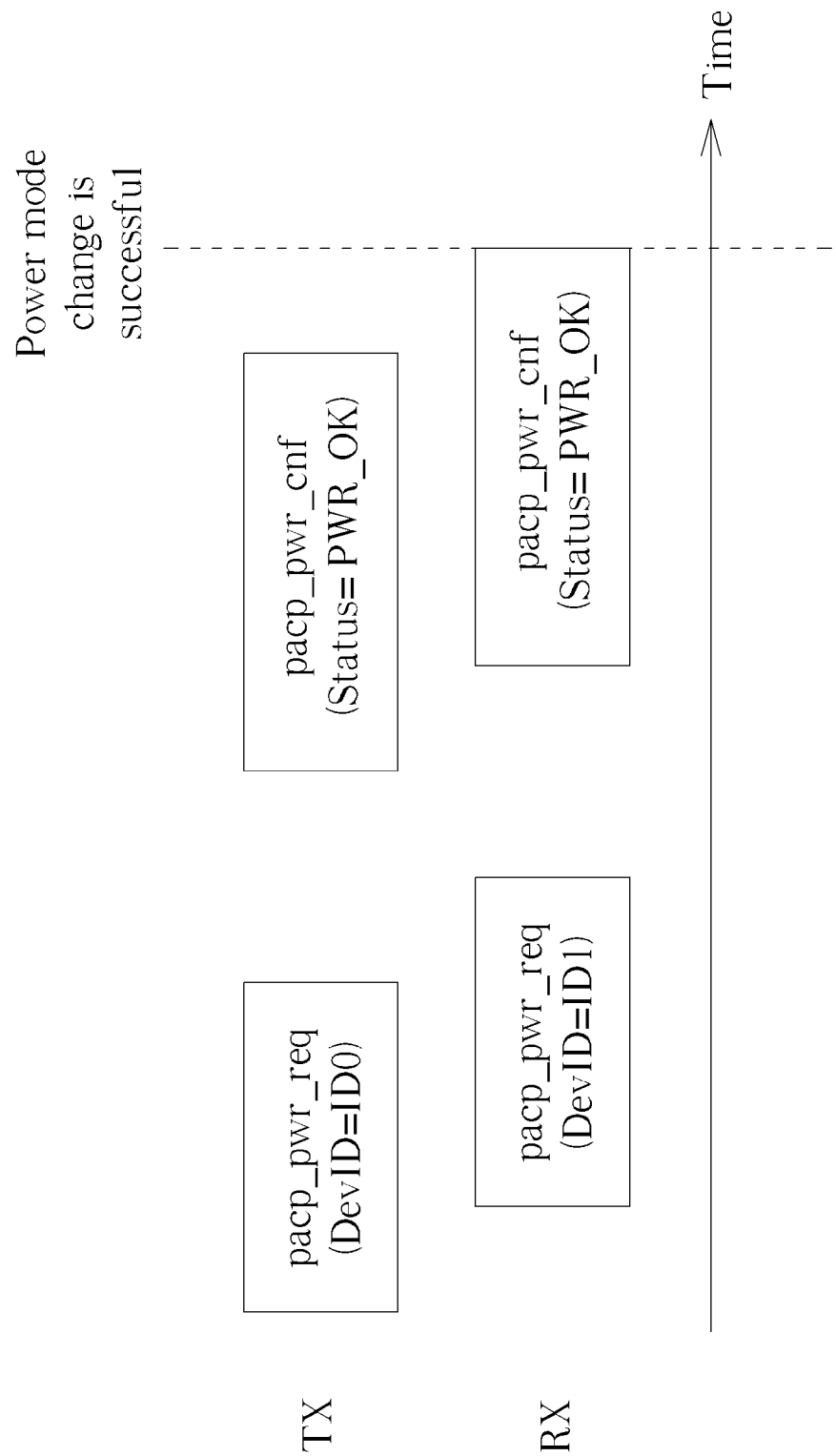
FIG. 6 is a diagram illustrating a successful power mode change procedure performed under a condition that a device ID field of a power mode change request frame is intentionally set by a fake device ID under a self-test mode according to an embodiment of the present invention.

FIG. 6 is a diagram illustrating a successful power mode change procedure performed under a condition that a device ID field of a power mode change request frame is intentionally set by a fake device ID under a self-test mode according to an embodiment of the present invention. Suppose that the actual device ID of the UniPro device 100 is set by "ID0". The UniPro interface 102 (particularly, the PHY adapter (L1.5) layer circuit 114) initiates a power mode change procedure by generating a pacp_pwr_req frame, wherein the device ID field of the pacp_pwr_req frame is intentionally set by a fake device ID "ID1" that is different from the actual device ID "ID0" assigned to the UniPro device 100. For example, the fake device ID "ID1" and the actual device ID "ID0" are properly set such that the fake device ID "ID1" is smaller than the actual device ID "ID0". The pacp_pwr_req frame with DevID="ID1" is transmitted via the TX port 116, and is received by the RX port 117 via the loopback link 10. As mentioned above, the pacp_pwr_req frame received by the RX port 117 may be regarded as a request frame generated from a remote UniPro device, and a request frame generated from a remote UniPro device may be rejected by a local UniPro device if the device ID of the remote UniPro device is larger or equal to the device ID of the local UniPro device. In this embodiment, since the fake device ID "ID1" is particularly set to be smaller than the actual device ID "ID0" assigned to the UniPro device 100 (i.e., ID1<ID0), the UniPro interface 102 (particularly, the PHY adapter layer (L1.5) circuit 114) generates a pacp_pwr_cnf frame in response to the received pacp_pwr_req frame, wherein the status field of the pacp_pwr_cnf frame is set by "PWR_OK" (which indicates that the power mode change request was accepted and executed). In other words, due to proper settings of the fake device ID "ID1" and the actual device ID "ID0", the status field of the pacp_pwr_cnf frame is ensured to indicate that the power mode change request was accepted and executed. The pacp_pwr_cnf frame with Status="PWR_OK" is transmitted via the TX port 116, and is received by the RX port 117 via the loopback link 10. In this way, the power mode change procedure is successfully completed to enable the HS mode for increasing the data exchange rate. The settings of power mode and data exchange rate recorded in the fields TxMode, TxLane, TxGear, RxMode, RxLane, RxGear of the pacp_pwr_req frame are confirmed by the pacp_pwr_cnf frame that have the same settings recorded in the fields TxMode, TxLane, TxGear, RxMode, RxLane, RxGear, where the TxMode field indicates the UniPro power mode for TX-direction, the TxLane field indicates the active lane count for TX-direction, the TxGear field indicates the HS gear setting for TX-direction, the RxMode field indicates the UniPro power mode for RX-direction, the RxLane field indicates the active lane count for RX-direction, and the RxGear field indicates the HS gear setting for RX-direction. Based on settings of data exchange rate requested in the pacp_pwr_req frame and confirmed by the pacp_pwr_cnf frame, the UniPro interface 102 (particularly, the PHY adapter layer (L1.5) circuit 114) further controls the physical layer circuit 104 to enter the HS mode and operate at the high data exchange rate.

In above embodiments shown in FIG. 5 and FIG. 6, the UniPro device 100 enables a high data exchange rate for HS mode test by performing a power mode change handshake procedure after a link startup procedure is completed. Alternatively, the high data exchange rate for HS mode test may be directly enabled without the need to do the power mode change handshake procedure. This also falls within the scope of the present invention.

In one alternative design, after a link startup procedure is completed, the UniPro interface 102 (particularly, the PHY adapter layer (L1.5) circuit 114) is further configured to have settings $S_{GEAR}$ that are changed to enable the HS mode for increasing a data exchange rate under the self-test mode, wherein the settings $S_{GEAR}$ are changed under a condition that no power mode change handshake procedure is performed. For example, the settings $S_{GEAR}$ may include an HS gear setting for TX-direction and an HS gear setting for RX-direction. Based on the settings $S_{GEAR}$ directly written into the UniPro interface 102 (particularly, the PHY adapter layer (L1.5) circuit 114) under the self-test mode, the UniPro interface 102 (particularly, the PHY adapter layer (L1.5) circuit 114) further controls the physical layer circuit 104 to enter the HS mode and operate at the high data exchange rate.

In another alternative design, after a link startup procedure is completed, the physical layer circuit 104 is further configured to have settings $S_{GEAR}'$ that are changed to enable the HS mode for increasing a data exchange rate under the self-test mode, wherein the settings $S_{GEAR}'$ are changed under a condition that no power mode change handshake procedure is performed. For example, the settings $S_{GEAR}'$ may include an HS gear setting for TX-direction and an HS gear setting for RX-direction. Based on the settings $S_{GEAR}'$ directly written into the physical layer (L1) circuit 104 under the self-test mode, the physical layer (L1) circuit 104 enters the HS mode and operates at the high data exchange rate.

After the UniPro device 100 enters the HS mode, a HS mode test can be performed under the self-test mode in which the TX port 116 is connected to the RX port 117 via the loopback link 10. In one exemplary embodiment, a test feature in the transport layer (L4) may be employed to perform the HS mode test. For example, the UniPro interface 102 (particularly, the transport layer (L4) circuit 111) is configured to generate an outgoing test pattern to the TX port 116 and check an incoming test pattern received from the RX port 117 under the self-test mode, where the incoming test pattern is originated from the outgoing test pattern passing through the loopback link 10.

As mentioned above, the LS mode test and/or the HS mode test can be performed under the self-test mode in which the TX port 116 and the RX port 117 of the physical layer (L1) circuit 104 is connected by the loopback link 10. However, these are for illustrative purposes only, and are not meant to be a limitation of the present invention. In some embodiments of the present invention, the UniPro device 100 may be controlled to enter and exit a Hibernate mode, such that a Hibernate mode test may be performed under the self-test mode in which the TX port 116 and the RX port 117 of the physical layer (L1) circuit 104 is connected by the loopback link 10.

Figure 7:
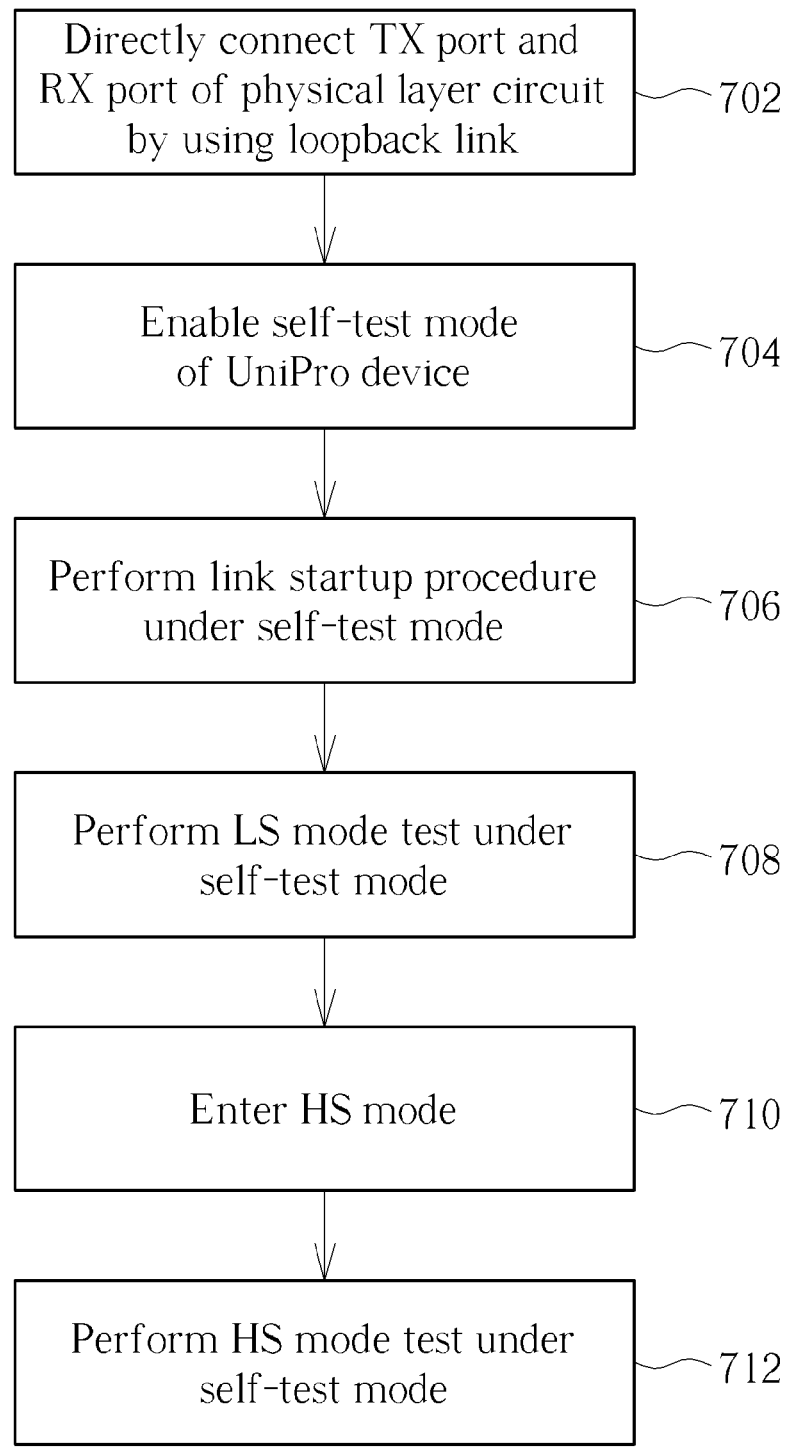
FIG. 7 is a flowchart illustrating a method for performing self functional test upon a UniPro device according to an embodiment of the present invention.

FIG. 7 is a flowchart illustrating a method for performing self functional test upon a UniPro device according to an embodiment of the present invention. Provided that the result is substantially the same, the steps are not required to be executed in the exact order shown in FIG. 7. In step 702, the TX port 116 of the physical layer (L1) circuit 104 is connected to the RX port 117 of the same physical layer circuit (L1) 104 via the loopback link 10. In step 704, a self-test mode of the UniPro device 100 is enabled, for example, by setting a control register of the UniPro interface 102. In step 706, a link startup procedure is performed under the self-test mode. In step 708, an LS mode test is performed under the self-test mode, for example, by using the transport layer circuit 111 as a pattern generator and a pattern checker. In step 710, the UniPro device 100 leaves the LS mode and enters the HS mode, for example, by performing a power mode change procedure or by directly writing gear settings into PHY adapter layer (L1.5) circuit 114/physical layer (L1) circuit 104. In step 712, an HS mode test is performed under the self-test mode, for example, by using the transport layer (L4) circuit 111 as a pattern generator and a pattern checker. It should be noted that step(s) in the flow may be omitted and/or additional step(s) may be added to the flow, depending upon actual design considerations. For example, step 708 shown in FIG. 7 may be omitted. For another example, additional steps for controlling the UniPro device 100 to enter a Hibernate mode, performing the Hibernate mode test under the self-test mode, and controlling the UniPro device 100 to exit the Hibernate mode may be added to the flow in FIG. 7. These alternative designs all fall within the scope of the present invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A Unified Protocol (UniPro) device with self functional test, comprising:
    a physical layer circuit, having a transmit (TX) port and a receive (RX) port, wherein the TX port and the RX port are connected to each other via a loopback link under a self-test mode; and
    a UniPro interface, configured to generate an outgoing test pattern to the TX port and check an incoming test pattern received from the RX port under the self-test mode;
    wherein the UniPro interface is further configured to perform a link startup procedure under the self-test mode, and the outgoing test pattern is transmitted via the TX port under the self-test mode after the link startup procedure is completed.

2. The UniPro device of claim 1, wherein after the link startup procedure is completed, the UniPro interface is further configured to perform a power mode change handshake procedure to adjust a data exchange rate under the self-test mode.

3. The UniPro device of claim 2, wherein the outgoing test pattern is transmitted via the TX port under the self-test mode after the power mode change handshake procedure is completed.

4. The UniPro device of claim 2, wherein during the power mode change handshake procedure, the UniPro interface is configured to:
    generate a power mode change request frame to the TX port;
    receive the power mode change request frame from the RX port;
    generate a power mode change confirm frame to the TX port in response to the power mode change request frame received from the RX port, wherein a status field of the power mode change confirm frame is forced to indicate that a power mode change request is accepted and executed, regardless of a device identification (ID) recorded in the power mode change request frame and a device ID assigned to the UniPro device; and
    receive the power mode change confirm frame from the RX port.

5. The UniPro device of claim 2, wherein during the power mode change handshake procedure, the UniPro interface is configured to:
    generate a power mode change request frame to the TX port, wherein a device identification (ID) field of the power mode change request frame is intentionally set by a fake device ID that is different from an actual device ID assigned to the UniPro device;
    receive the power mode change request frame from the RX port;
    generate a power mode change confirm frame to the TX port in response to the power mode change request frame received from the RX port, wherein a status field of the power mode change confirm frame is ensured to indicate that a power mode change request is accepted and executed due to the fake device ID and the actual device ID; and
    receive the power mode change confirm frame from the RX port.

6. The UniPro device of claim 1, wherein after the link startup procedure is completed, the UniPro interface is further configured to have settings that are changed to adjust a data exchange rate under the self-test mode, and the settings are changed under a condition that no power mode change handshake procedure is performed.

7. The UniPro device of claim 6, wherein the outgoing test pattern is transmitted via the TX port under the self-test mode after the settings are changed.

8. A Unified Protocol (UniPro) device with self functional test, comprising:
- a physical layer circuit, having a transmit (TX) port and a receive (RX) port, wherein the TX port and the RX port are connected to each other via a loopback link under a self-test mode; and
- a UniPro interface, configured to generate an outgoing test pattern to the TX port and check an incoming test pattern received from the RX port under the self-test mode;
- wherein after a link startup procedure is completed, the physical layer circuit is further configured to have settings that are changed to adjust a data exchange rate under the self-test mode, and the settings are changed under a condition that no power mode change handshake procedure is performed.

9. The UniPro device of claim 8, wherein the outgoing test pattern is transmitted via the TX port under the self-test mode after the settings are changed.

10. A method for performing self functional test upon a Unified Protocol (UniPro) device having a UniPro interface and a physical layer circuit, comprising:
- connecting a transmit (TX) port of the physical layer circuit to a receive (RX) port of the physical layer circuit via a loopback link under a self-test mode;
- utilizing the UniPro interface to generate an outgoing test pattern to the TX port and check an incoming test pattern received from the RX port under the self-test mode; and
- utilizing the UniPro interface to perform a link startup procedure under the self-test mode;
- wherein after the link startup procedure is completed, the outgoing test pattern is transmitted via the TX port under the self-test mode.

11. The method of claim 10, further comprising:
- after the link startup procedure is completed, utilizing the UniPro interface to perform a power mode change handshake procedure to adjust a data exchange rate under the self-test mode.

12. The method of claim 11, wherein after the power mode change handshake procedure is completed, the outgoing test pattern is transmitted via the TX port under the self-test mode.

13. The method of claim 11, wherein utilizing the UniPro interface to perform the power mode change handshake procedure comprises:
- generating a power mode change request frame to the TX port;
- receiving the power mode change request frame from the RX port;
- generating a power mode change confirm frame to the TX port in response to the power mode change request frame received from the RX port, wherein a status field of the power mode change confirm frame is forced to indicate that a power mode change request is accepted and executed, regardless of a device identification (ID) recorded in the power mode change request frame and a device ID assigned to the UniPro device; and
- receiving the power mode change confirm frame from the RX port.

14. The method of claim 11, wherein utilizing the UniPro interface to perform the power mode change handshake procedure comprises:
- generating a power mode change request frame to the TX port, wherein a device identification (ID) field of the power mode change request frame is intentionally set by a fake device ID that is different from an actual device ID assigned to the UniPro device;
- receiving the power mode change request frame from the RX port;
- generating a power mode change confirm frame to the TX port in response to the power mode change request frame received from the RX port, wherein a status field of the power mode change confirm frame is ensured to indicate that a power mode change request is accepted and executed due to the fake device ID and the actual device ID; and
- receiving the power mode change confirm frame from the RX port.

15. The method of claim 10, further comprising:
- after the link startup procedure is completed, changing settings of the UniPro interface to adjust a data exchange rate under the self-test mode without performing a power mode change handshake procedure.

16. The method of claim 15, wherein the outgoing test pattern is transmitted via the TX port under the self-test mode after the settings are changed.

17. The method of claim 10, further comprising:
- after the link startup procedure is completed, changing settings of the physical layer circuit to adjust a data exchange rate under the self-test mode without performing a power mode change handshake procedure.

18. The method of claim 17, wherein the outgoing test pattern is transmitted via the TX port under the self-test mode after the settings are changed.

* * * * *